June 3, 1924.
T. W. COOPER
LENS
Filed Sept. 13, 1922
1,496,652
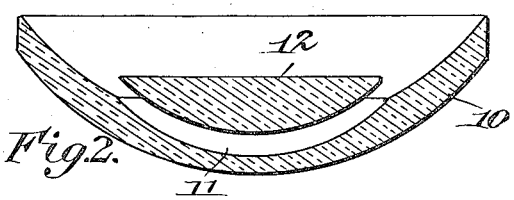
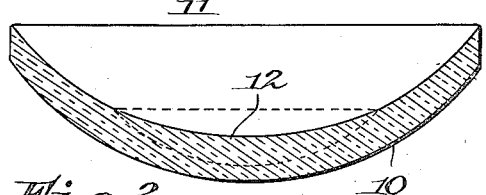
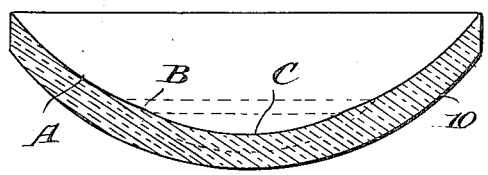
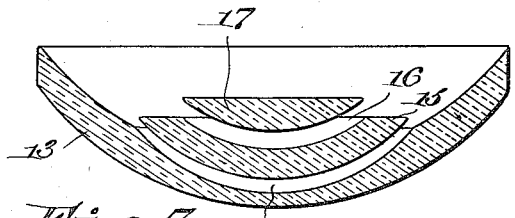
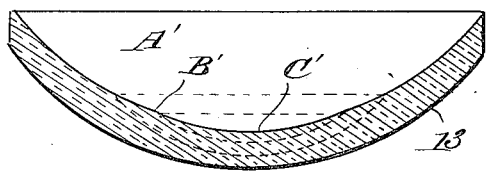
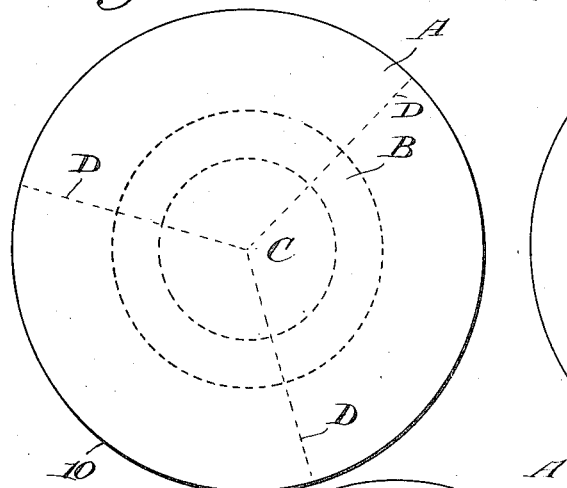
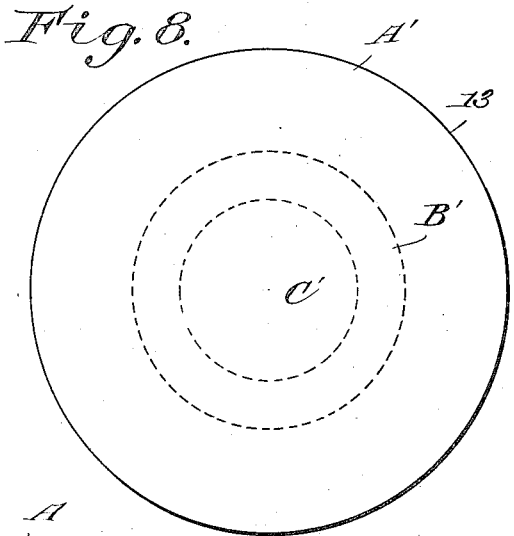
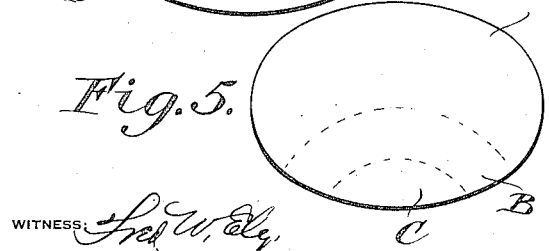
Thomas W. Cooper, INVENTOR
BY Victor J. Evans ATTORNEY
WITNESS: Fred W. Ely Patented June 3, 1924.

1,496,652

UNITED STATES PATENT OFFICE.

THOMAS W. COOPER, OF BROOKLYN, NEW YORK.

LENS.

Application filed September 13, 1922. Serial No. 588,048.

*To all whom it may concern:*

Be it known that I, THOMAS W. COOPER, a citizen of the United States, residing at Brooklyn, in the county of Kings and State of New York, have invented new and useful Improvements in Lenses, of which the following is a specification.

This invention relates to the class of optics and more particularly to lenses of the bifocal type and has for its object to provide a lens of this character which shall reside in certain improvements in the form of my invention shown and described in United States Letters Patent No. 1,425,452, granted August 8th, 1922.

A further object of the invention is to provide a lens consisting of previously partly ground sections capable of being fused together and arranged with respect to each other whereby the lens may be further treated to a simple grinding and polishing operation and its manufacture quickly completed.

Another object of the invention is to provide a lens made up of a plurality of crystals respectively of different index of refraction and dioptric curvatures, said crystals being fused together and properly ground to provide concentric fields of vision wherein the lines of joinder between the fields are of uniform thickness and without shoulders or projections which would cause zones of aberration.

With the above and other objects in view which will appear as the nature of the invention is better understood, the same consists in the improved construction and novel arrangements of parts which will hereinafter be more fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1, is a transverse section through the two crystals showing the same separated.

Figure 2, is a similar view showing the crystals fused together with the major base ground and polished.

Figure 3 is a similar view showing the two crystals fused and ground with a third concentric field and ready to be separated into a number of individual lenses.

Figure 4, is a plan view.

Figure 5 is a front view of the finished lens.

Figures 6, 7 and 8 are illustrative of a modified form of my invention.

In carrying the invention into practice and with particular reference to Figures 1 to 4, of the drawing, I employ what I will hereinafter refer to as a circular concavoconvex major crystal 10, formed to provide a predetermined index of refraction and having its concaved side provided at its center with a ground and polished countersink 11. Mounted in this countersink 11, is a second circular convex crystal or segment 12 of a different index of refraction. This second crystal is formed at one side to adapt itself to said countersink 11. The convexed side of said crystal 12, is ground and polished and the crystal fused to the aforesaid major crystal. After the two crystals are fused together as aforesaid, the concaved side of the major crystal and the exposed side of the crystal 12 are subjected to a grinding and polishing operation so as to provide concentric fields of vision A, B, and C, as clearly shown in Figures 3 and 4. It will of course be understood that in treating the crystals to a grinding and polishing operation after the crystals are fused together, that grinding and polishing tools of relatively different dioptric curvatures are employed and in this grinding operation and through the arrangement of the crystals as described, I am able to produce a finished lens in which the lines of joinder between the respective optical fields will be of uniform thickness so as to prevent spherical aberration.

After the crystals have been fused together and ground as aforesaid, I divide the structure on the dotted lines D, so as to provide a plurality of identical sections. I then finish each of these sections to provide a bifocal lens as shown in Figure 5. The fields A and C in the finished lens will be hereinafter referred to as distance fields and the field B, as a reading, intermediate or near field.

In the modified form of the invention shown in Figures 6, 7 and 8, I employ a major crystal 13, which is in substantial agreement with the crystal 10, the same having a countersink 14 in which a second crystal 15, is mounted. This second crystal is ground and polished upon both sides and same is fused to the aforesaid crystal 13. The concave of the countersink 14 is also ground and polished before the crystal 15 is applied and fused in position.

In this modified form, the crystal 15 is provided with a countersink 16, which accommodates a convex crystal 17 whose convexed side is previously ground and polished. This crystal 17 is then fused to the crystal 15. After all of the crystals are fused together as described, they are subjected to a finishing, grinding and polishing operation so as to provide concentric fields A', B', and C', which correspond with the fields A, B, and C.

It will of course be understood that after these crystals are finally ground to the proper optical curvature they are cut into sections as previously referred to so as to provide finished bifocal lenses.

While I have described in each instance, the fusing together of a number of crystals, wherein one or more small crystals are arranged upon the concaved side of a large crystal, this shall be understood as illustrative of one manner of carrying the invention into practice. As a matter of fact, the small crystal or crystals can be arranged upon the convexed side of the large crystal and the crystals respectively treated to such grinding and polishing methods as will be required to give to the finished lens the aforesaid fields of vision.

Upon reference to Figure 2, of the drawing it will be seen that when the second crystal is mounted in the aforesaid countersink of the first crystal, the two give to the structure two concentric optical fields. The third concentric field is formed by grinding the second crystal as stated, In Figure 6, when the crystal 15, is mounted in the countersink 14 of the crystal 13, the whole structure presents two concentric optical fields and when the third crystal 17 is applied in the concave or countersink 16, and said third crystal ground as desired, a third concentric optical field is presented.

What I claim as new is:—

1. As a new article of manufacture, a multifocal lens formed of a plurality of crystals fused together and respectively related to one another to provide the lens with upper and lower distance fields of like focus and an interposed reading field, said reading field extending clear across the lens at a point below the medial line thereof.

2. A multifocal lens comprising a plurality of crystals fused together and respectively related to one another to provide the lens with upper and lower distance fields and an interposed reading field, said reading field extending clear across the lens at a point below the medial line thereof, all of the said fields being arranged concentrically of one another.

3. A multifocal lens formed of a major crystal blank and a segment crystal fused thereto and being of a different index of refraction, said major blank having a centrally disposed concaved countersink formed therein, said segment crystal being ground to conform to the concaved countersink and fused therein, said major crystal blank and segment crystal being ground to form a base curve in a manner to provide two fields of focus, said segment crystal being formed with a concaved neutralizing curve arranged in the center thereof to provide a third field of focus, said fused members being capable of division to produce a plurality of lenses having a reading field disposed between the two distance fields of like focus and each of the produced lenses being so formed whereby the side opposite the segment crystal may be ground to any optical formula without any of the three fields changing the relative value of the spherical or cylindrical focus thereof.

In testimony whereof I have affixed my signature.

THOMAS W. COOPER.